United States Patent
Asanuma

(10) Patent No.: US 11,569,691 B2
(45) Date of Patent: Jan. 31, 2023

(54) ELECTRONIC APPARATUS AND METHOD

(71) Applicant: KABUSHIKI KAISHA TOSHIBA, Tokyo (JP)

(72) Inventor: Yutaka Asanuma, Bunkyo Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 881 days.

(21) Appl. No.: 16/299,086

(22) Filed: Mar. 11, 2019

(65) Prior Publication Data

US 2020/0076238 A1 Mar. 5, 2020

(30) Foreign Application Priority Data

Sep. 5, 2018 (JP) .............................. JP2018-165855

(51) Int. Cl.
*H02J 50/80* (2016.01)
*H02J 50/20* (2016.01)
*H02J 7/02* (2016.01)

(52) U.S. Cl.
CPC .............. *H02J 50/20* (2016.02); *H02J 50/80* (2016.02); *H02J 7/025* (2013.01)

(58) Field of Classification Search
CPC ............. H02J 50/20; H02J 50/80; H02J 7/025
See application file for complete search history.

(56) References Cited

U.S. PATENT DOCUMENTS

| | | |
|---|---|---|
| 9,368,020 B1 | 6/2016 | Bell et al. |
| 9,438,045 B1 | 9/2016 | Leabman |
| 9,450,449 B1 | 9/2016 | Leabman et al. |
| 9,521,926 B1 | 12/2016 | Leabman et al. |
| 9,787,103 B1 | 10/2017 | Leabman et al. |
| 9,800,172 B1 | 10/2017 | Leabman |
| 9,812,890 B1 | 11/2017 | Leabman et al. |
| 9,825,674 B1 | 11/2017 | Leabman |
| 9,847,677 B1 | 12/2017 | Leabman et al. |
| 9,853,458 B1 | 12/2017 | Bell et al. |
| 9,853,692 B1 | 12/2017 | Bell et al. |
| 9,859,757 B1 | 1/2018 | Leabman et al. |
| 9,859,797 B1 | 1/2018 | Leabman |
| 9,867,062 B1 | 1/2018 | Bell et al. |
| 9,871,387 B1 | 1/2018 | Bell et al. |
| 9,871,398 B1 | 1/2018 | Leabman |
| 9,876,379 B1 | 1/2018 | Leabman et al. |
| 9,876,380 B1 | 1/2018 | Leabman et al. |
| 9,876,394 B1 | 1/2018 | Leabman |

(Continued)

FOREIGN PATENT DOCUMENTS

| | | |
|---|---|---|
| JP | 2012244844 A | 12/2012 |
| JP | 2013188032 A | 9/2013 |

(Continued)

*Primary Examiner* — Richard Isla
*Assistant Examiner* — Johali A Torres Ruiz
(74) *Attorney, Agent, or Firm* — Holtz, Holtz & Volek PC

(57) ABSTRACT

According to one embodiment, an electronic apparatus includes a power transmitter and control circuitry. The power transmitter is configured to transmit power by using electromagnetic waves. The control circuitry is configured to transmit a first request including information on the electronic apparatus to a first server before power transmission, and start power transmission by the power transmitter if a first response from the first server relating to the first request is received.

14 Claims, 7 Drawing Sheets

(56) References Cited

U.S. PATENT DOCUMENTS

| | | |
|---|---|---|
| 9,876,536 B1 | 1/2018 | Bell et al. |
| 9,882,395 B1 | 1/2018 | Leabman et al. |
| 9,882,430 B1 | 1/2018 | Leabman et al. |
| 9,887,584 B1 | 2/2018 | Bell et al. |
| 9,893,538 B1 | 2/2018 | Bell et al. |
| 9,893,555 B1 | 2/2018 | Leabman et al. |
| 9,899,861 B1 | 2/2018 | Leabman et al. |
| 9,917,477 B1 | 3/2018 | Bell et al. |
| 9,923,386 B1 | 3/2018 | Leabman et al. |
| 9,935,482 B1 | 4/2018 | Leabman et al. |
| 9,939,864 B1 | 4/2018 | Bell et al. |
| 9,941,707 B1 | 4/2018 | Leabman |
| 9,954,374 B1 | 4/2018 | Bell et al. |
| 9,965,009 B1 | 5/2018 | Bell et al. |
| 9,966,765 B1 | 5/2018 | Leabman et al. |
| 9,973,008 B1 | 5/2018 | Leabman |
| 9,979,440 B1 | 5/2018 | Leabman et al. |
| 9,991,741 B1 | 6/2018 | Bell et al. |
| 10,003,211 B1 | 6/2018 | Leabman et al. |
| 10,038,337 B1 | 7/2018 | Leabman et al. |
| 10,063,064 B1 | 8/2018 | Bell et al. |
| 10,075,008 B1 | 9/2018 | Bell et al. |
| 10,090,699 B1 | 10/2018 | Leabman et al. |
| 10,090,886 B1 | 10/2018 | Bell et al. |
| 10,103,552 B1 | 10/2018 | Leabman et al. |
| 10,124,754 B1 | 11/2018 | Leabman et al. |
| 10,148,097 B1 | 12/2018 | Leabman et al. |
| 10,153,645 B1 | 12/2018 | Bell et al. |
| 10,153,653 B1 | 12/2018 | Bell et al. |
| 10,170,917 B1 | 1/2019 | Bell et al. |
| 10,193,396 B1 | 1/2019 | Bell et al. |
| 10,199,849 B1 | 2/2019 | Bell et al. |
| 2008/0122297 A1* | 5/2008 | Arai .................. H01Q 7/00 307/154 |
| 2012/0299373 A1 | 11/2012 | Yoshida |
| 2014/0008992 A1 | 1/2014 | Leabman |
| 2014/0008993 A1 | 1/2014 | Leabman |
| 2014/0009108 A1 | 1/2014 | Leabman |
| 2014/0239733 A1* | 8/2014 | Mach .................. H04B 5/0037 307/104 |
| 2014/0354063 A1 | 12/2014 | Leabman et al. |
| 2014/0354221 A1 | 12/2014 | Leabman et al. |
| 2014/0357309 A1 | 12/2014 | Leabman et al. |
| 2014/0368048 A1 | 12/2014 | Leabman et al. |
| 2014/0368161 A1 | 12/2014 | Leabman et al. |
| 2014/0375253 A1 | 12/2014 | Leabman et al. |
| 2014/0375255 A1 | 12/2014 | Leabman et al. |
| 2014/0376646 A1 | 12/2014 | Leabman et al. |
| 2015/0001949 A1 | 1/2015 | Leabman et al. |
| 2015/0015192 A1 | 1/2015 | Leabman et al. |
| 2015/0015194 A1 | 1/2015 | Leabman et al. |
| 2015/0015195 A1 | 1/2015 | Leabman et al. |
| 2015/0022008 A1 | 1/2015 | Leabman et al. |
| 2015/0022009 A1 | 1/2015 | Leabman et al. |
| 2015/0022010 A1 | 1/2015 | Leabman et al. |
| 2015/0028694 A1 | 1/2015 | Leabman et al. |
| 2015/0029397 A1 | 1/2015 | Leabman et al. |
| 2015/0041459 A1 | 2/2015 | Leabman et al. |
| 2015/0042265 A1 | 2/2015 | Leabman et al. |
| 2015/0076917 A1 | 3/2015 | Leabman et al. |
| 2015/0076927 A1 | 3/2015 | Leabman et al. |
| 2015/0077036 A1 | 3/2015 | Leabman et al. |
| 2015/0077037 A1 | 3/2015 | Leabman et al. |
| 2015/0102681 A1 | 4/2015 | Leabman et al. |
| 2015/0102764 A1 | 4/2015 | Leabman et al. |
| 2015/0102769 A1 | 4/2015 | Leabman et al. |
| 2015/0123483 A1 | 5/2015 | Leabman et al. |
| 2015/0123496 A1 | 5/2015 | Leabman et al. |
| 2015/0130285 A1 | 5/2015 | Leabman et al. |
| 2015/0155738 A1 | 6/2015 | Leabman et al. |
| 2015/0162751 A1 | 6/2015 | Leabman et al. |
| 2015/0171656 A1 | 6/2015 | Leabman et al. |
| 2015/0222126 A1 | 8/2015 | Leabman et al. |
| 2015/0318729 A1 | 11/2015 | Leabman |
| 2015/0326024 A1 | 11/2015 | Bell et al. |
| 2015/0326025 A1 | 11/2015 | Bell et al. |
| 2015/0326026 A1 | 11/2015 | Leabman |
| 2015/0326027 A1 | 11/2015 | Leabman |
| 2015/0326051 A1 | 11/2015 | Bell et al. |
| 2015/0326052 A1 | 11/2015 | Leabman |
| 2015/0326068 A1 | 11/2015 | Bell et al. |
| 2015/0326069 A1 | 11/2015 | Petras et al. |
| 2015/0326070 A1 | 11/2015 | Petras et al. |
| 2015/0326072 A1 | 11/2015 | Petras et al. |
| 2015/0326142 A1 | 11/2015 | Petras et al. |
| 2015/0326143 A1 | 11/2015 | Petras et al. |
| 2015/0333528 A1 | 11/2015 | Leabman |
| 2015/0333529 A1 | 11/2015 | Leabman |
| 2015/0333572 A1 | 11/2015 | Leabman |
| 2015/0333573 A1 | 11/2015 | Leabman |
| 2015/0340903 A1 | 11/2015 | Bell et al. |
| 2015/0340909 A1 | 11/2015 | Bell et al. |
| 2015/0340910 A1 | 11/2015 | Petras et al. |
| 2015/0340911 A1 | 11/2015 | Bell et al. |
| 2015/0349574 A1 | 12/2015 | Leabman |
| 2015/0349850 A1 | 12/2015 | Leabman |
| 2016/0012695 A1 | 1/2016 | Bell et al. |
| 2016/0013656 A1 | 1/2016 | Bell et al. |
| 2016/0013677 A1 | 1/2016 | Bell et al. |
| 2016/0013678 A1 | 1/2016 | Bell et al. |
| 2016/0020649 A1 | 1/2016 | Bell et al. |
| 2016/0020830 A1 | 1/2016 | Bell et al. |
| 2016/0054395 A1 | 2/2016 | Bell et al. |
| 2016/0054396 A1 | 2/2016 | Bell et al. |
| 2016/0056635 A1 | 2/2016 | Bell |
| 2016/0056669 A1 | 2/2016 | Bell |
| 2016/0056966 A1 | 2/2016 | Bell |
| 2016/0099601 A1 | 4/2016 | Leabman et al. |
| 2016/0099602 A1 | 4/2016 | Leabman et al. |
| 2016/0099609 A1 | 4/2016 | Leabman et al. |
| 2016/0099610 A1 | 4/2016 | Leabman et al. |
| 2016/0099611 A1 | 4/2016 | Leabman et al. |
| 2016/0099612 A1 | 4/2016 | Leabman et al. |
| 2016/0099613 A1 | 4/2016 | Bell et al. |
| 2016/0099614 A1 | 4/2016 | Leabman et al. |
| 2016/0099755 A1 | 4/2016 | Leabman et al. |
| 2016/0099756 A1 | 4/2016 | Leabman et al. |
| 2016/0099757 A1 | 4/2016 | Leabman et al. |
| 2016/0099758 A1 | 4/2016 | Bell et al. |
| 2016/0100124 A1 | 4/2016 | Leabman et al. |
| 2016/0100312 A1 | 4/2016 | Bell et al. |
| 2016/0181854 A1 | 6/2016 | Leabman |
| 2016/0183056 A1 | 6/2016 | Leabman |
| 2016/0191121 A1 | 6/2016 | Bell et al. |
| 2016/0204622 A1 | 7/2016 | Leabman |
| 2016/0241044 A1 | 8/2016 | Leabman |
| 2016/0241045 A1 | 8/2016 | Leabman |
| 2017/0017963 A1* | 1/2017 | Cho .................. G06Q 20/3227 |
| 2017/0077736 A1 | 3/2017 | Leabman |
| 2017/0077765 A1 | 3/2017 | Bell et al. |
| 2017/0085120 A1 | 3/2017 | Leabman et al. |
| 2017/0110887 A1 | 4/2017 | Bell et al. |
| 2017/0110888 A1 | 4/2017 | Leabman |
| 2017/0142687 A1* | 5/2017 | Kim .................. H04W 72/0453 |
| 2017/0179771 A1 | 6/2017 | Leabman |
| 2017/0373544 A1* | 12/2017 | Niizuma .................. H02J 50/80 |
| 2018/0048178 A1 | 2/2018 | Leabman |
| 2018/0191190 A1* | 7/2018 | Chu .................. H02J 50/80 |
| 2018/0226840 A1 | 8/2018 | Leabman et al. |
| 2018/0241255 A1 | 8/2018 | Leabman |
| 2019/0067999 A1* | 2/2019 | Yu .................. H02J 50/90 |
| 2019/0387421 A1* | 12/2019 | Cho .................. H04W 24/04 |

FOREIGN PATENT DOCUMENTS

| | | |
|---|---|---|
| JP | 2014207758 A | 10/2014 |
| JP | 2018506252 A | 3/2018 |

\* cited by examiner

| Start request (continuation request) ||
|---|---|
| Required | Apparatus ID |
| Optional | State information (position information, azimuth information, angle information, time information, output information, antenna setting information, frequency information, radio wave type information, message ID, etc.) |

F I G. 4

| Start response (continuation response) ||
|---|---|
| Required | Message identification information (apparatus ID, message ID, etc.) |
| Optional | Response information (approval time information, approval period information) |

F I G. 5

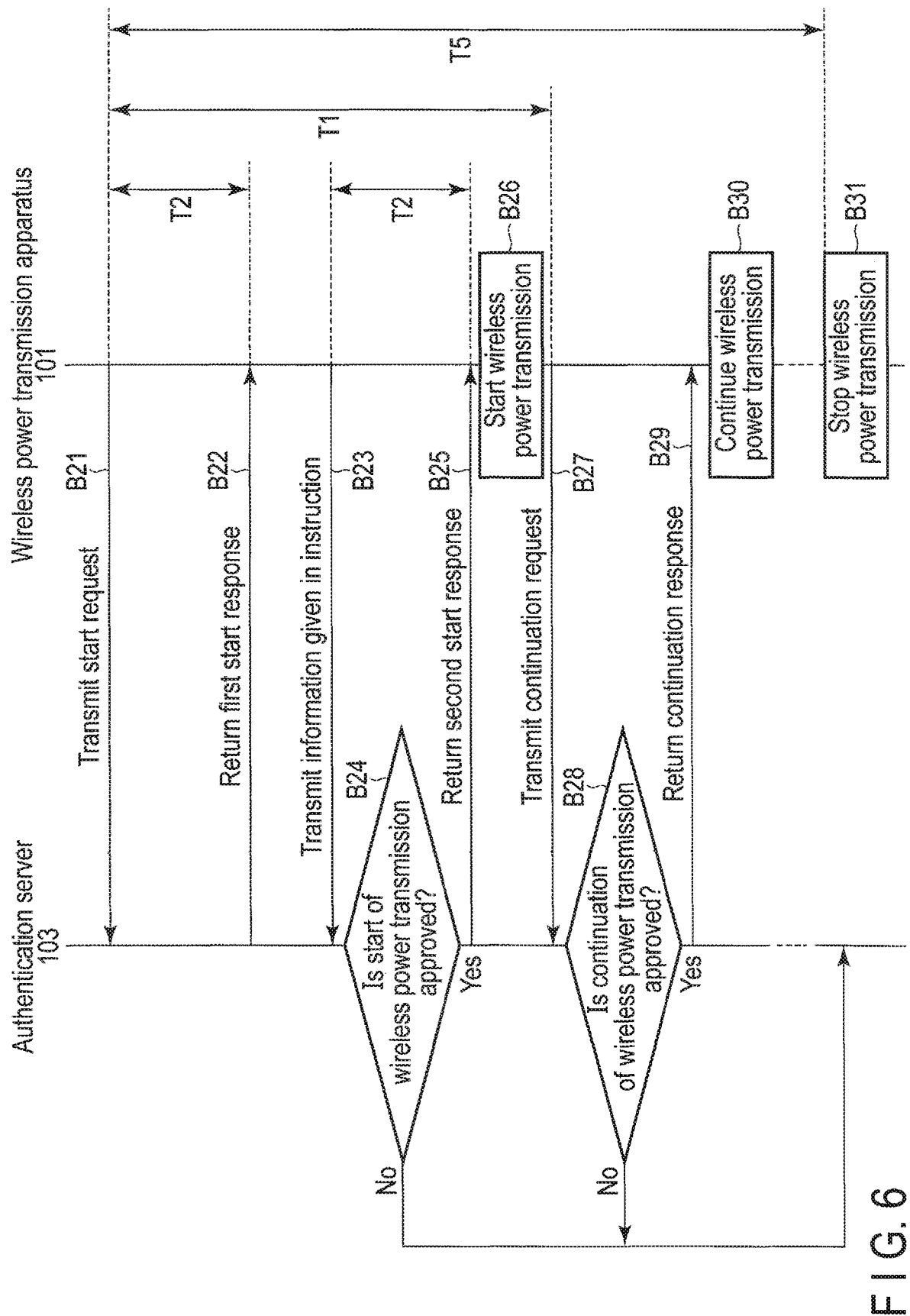
F I G. 6

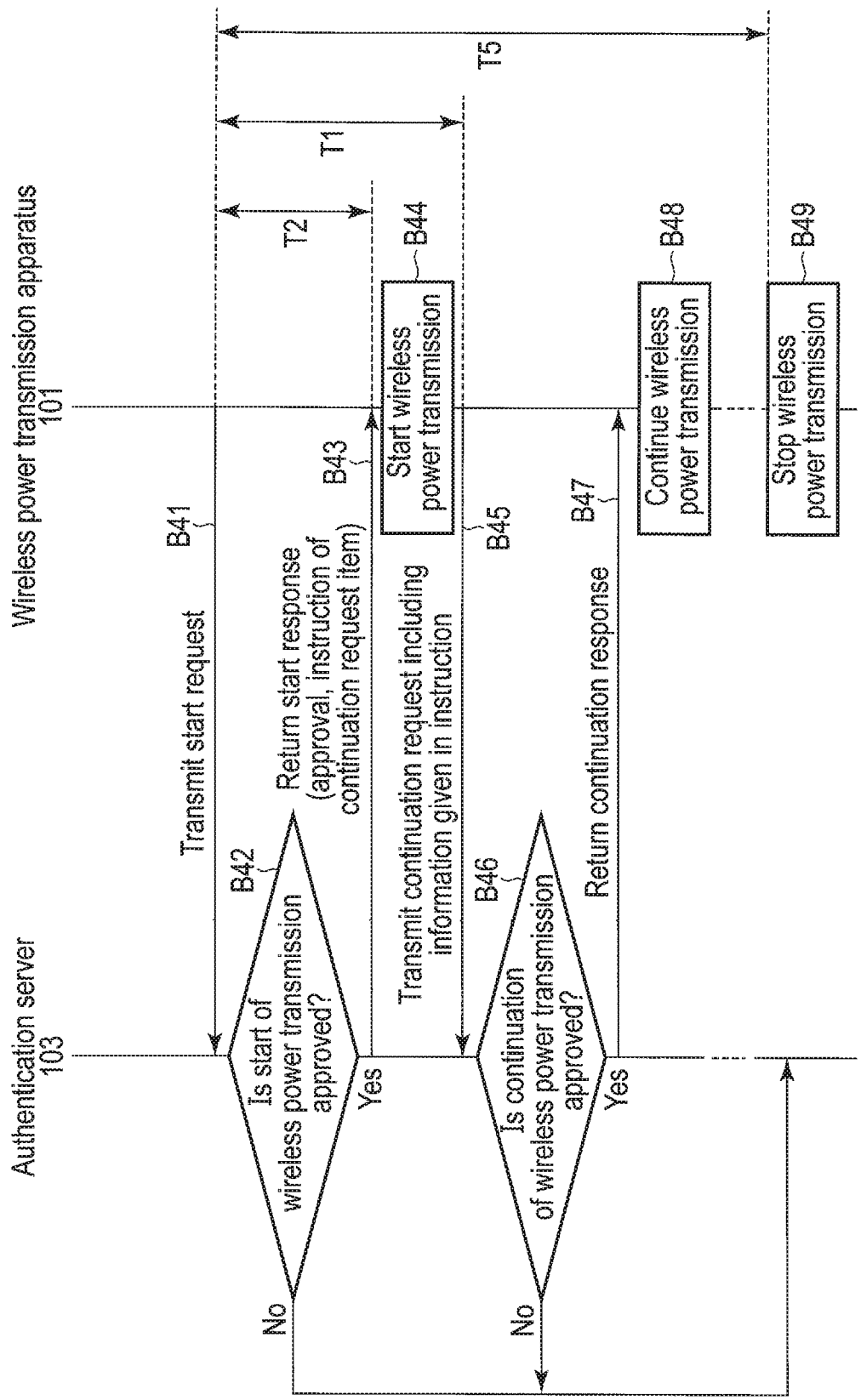
F I G. 7

ELECTRONIC APPARATUS AND METHOD

CROSS-REFERENCE TO RELATED APPLICATIONS

This application is based upon and claims the benefit of priority from Japanese Patent Application No. 2018-165855, filed Sep. 5, 2018, the entire contents of which are incorporated herein by reference.

FIELD

Embodiments described herein relate generally to an electronic apparatus and a method.

BACKGROUND

Generally, in wireless power transmission in which electric power is transmitted using electromagnetic waves, the transmission power when radiating electromagnetic waves is larger than the power of wireless signals transmitted and received by other wireless communication systems, so that the electromagnetic waves may interfere with other wireless communication systems when wireless power transmission is carried out everywhere.

Therefore, it is desired to develop technology capable of performing wireless power transmission without giving serious interference to other wireless communication systems.

BRIEF DESCRIPTION OF THE DRAWINGS

FIG. 4 is a diagram for explaining a start request according to the embodiment.

FIG. 5 is a diagram for explaining a start response according to the embodiment.

FIG. 6 is a sequence chart showing a series of processing procedures different from that of FIG. 3.

FIG. 7 is another sequence chart showing a series of processing procedures different from that of FIG. 3.

DETAILED DESCRIPTION

Figure 1:
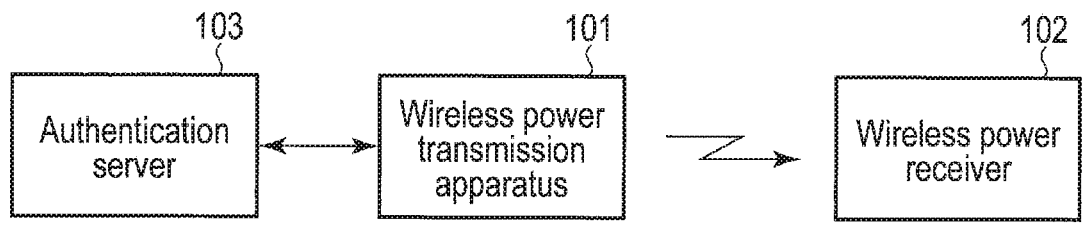
FIG. 1 shows an example of a wireless power transfer environment according to an embodiment.

In general, according to one embodiment, an electronic apparatus includes a power transmitter and control circuitry. The power transmitter is configured to transmit power by using electromagnetic waves. The control circuitry is configured to transmit a first request including information on the electronic apparatus to a first server before power transmission, and start power transmission by the power transmitter if a first response from the first server relating to the first request is received.

Hereinafter, embodiments will be described with reference to the drawings. The disclosure is merely an example, and the invention is not limited to the following embodiments. Naturally, the modifications easily conceivable by those skilled in the art are included in the scope of the disclosure. In order to make the description clearer, there are cases where the size, shape, etc., of each part in the drawings are schematically represented by changing them relative to the actual implementation. In a plurality of drawings, corresponding elements are denoted by the same reference numerals, and a detailed explanation may be omitted.

FIG. 1 shows an example of a wireless power transfer environment including a wireless power transmission apparatus according to an embodiment. The wireless power transfer environment shown in FIG. 1 includes a wireless power transmission apparatus 101, a wireless power receiver 102, and an authentication server 103. In FIG. 1, the case where the wireless power transmission apparatus 101 performs wireless power transmission (also referred to as "wireless power transfer" or "wireless power supply") to one wireless power receiver 102 has been illustrated, but the present embodiment is not limited thereto. The wireless power transmission apparatus 101 may perform wireless power transmission to a plurality of wireless power receiver 102.

The wireless power transmission apparatus 101 transmits power to the wireless power receiver 102 using electromagnetic waves of a predetermined frequency band. Note that the wireless power transmission apparatus 101 performs wireless power transmission using, for example, frequencies in the 5.7 GHz to 5.8 GHz band.

Upon receiving electromagnetic waves radiated from the wireless power transmission apparatus 101, the wireless power receiver 102 converts the received electromagnetic waves into direct-current power using a rectifier, supplies the electric power to a secondary battery or the like to charge it. When the wireless power receiver 102 does not have a secondary battery, the direct-current power may be directly supplied to the load in the wireless power receiver 102.

When the wireless power transmission apparatus 101 performs wireless power transmission to the wireless power receiver 102 within the range managed by the authentication server 103, the authentication server 103 determines whether the wireless power transmission apparatus 101 is an apparatus registered in advance in the authentication server 103 (authorized apparatus). When the wireless power transmission apparatus 101 is an apparatus registered in advance, the authentication server 103 approves (permits) that the wireless power transmission apparatus 101 performs wireless power transmission within the range managed by the authentication server 103. When it is not a preregistered apparatus, the authentication server 103 disapproves (prohibits) that the wireless power transmission apparatus 101 performs wireless power transmission within the range managed by the authentication server 103.

Generally, the transmission power (the power of the electromagnetic waves) when the wireless power transmission apparatus 101 radiates electromagnetic waves is bigger than the power of the wireless signal transmitted and received by a wireless communication apparatus included in a wireless LAN system or a dedicated short range communications (DSRC) system. For this reason, when the wireless power transmission apparatus 101 is used everywhere, the electromagnetic waves radiated by the wireless power transmission apparatus 101 may interfere with a wireless signal transmitted and received in the wireless LAN system or the DSRC system located around the wireless power transmission apparatus 101. In this case, transmission and reception of wireless signals may not be performed normally in the wireless LAN system or the DSRC system.

For this reason, managing whether the wireless power transmission apparatus 101 is in an environment in which the wireless power transmission apparatus 101 may perform wireless power transmission is one of important matters when using the wireless power transmission apparatus 101. Hereinafter, a wireless power transmission apparatus 101 that has capability of determining whether the wireless power transmission apparatus 101 is in an environment in which wireless power transmission may be performed will be described.

Figure 2:
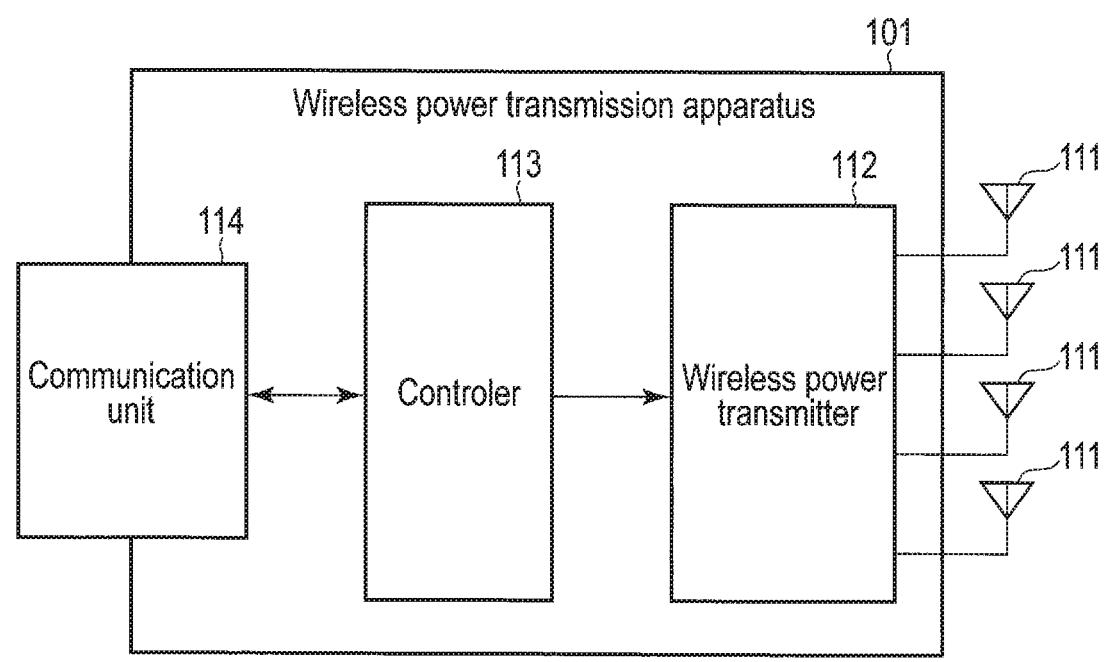
FIG. 2 shows an example of a hardware configuration of a wireless power transmission apparatus according to the embodiment.

FIG. 2 shows an example of a hardware configuration of the wireless power transmission apparatus 101. As shown in FIG. 2, the wireless power transmission apparatus 101 includes at least one antenna 111, a wireless power transmitter (WPT) 112, a controller 113 (control circuitry), and a communication unit 114. It is assumed here that a wireless power transmitter 112 and the controller 113 are constructed by one chip, but the present embodiment is not limited thereto, and each unit may be constructed by a separate chip.

The antenna 111 radiates electromagnetic waves to the wireless power receiver 102 in order to perform wireless power transmission.

The wireless power transmitter 112 supplies a power transmission signal to the antenna 111 in accordance with an instruction from the controller 113 to perform wireless power transmission. When a power transmission signal is supplied to the antenna 111, the antenna 111 generates electromagnetic waves to radiate the generated electromagnetic waves to the wireless power receiver 102 with predetermined transmission power (power of electromagnetic waves).

The controller 113 communicates with the authentication server 103 via the communication unit 114 before wireless power transmission to the wireless power receiver 102 is performed, and performs authentication processing for obtaining approval to the effect that wireless power transmission may be performed within the range managed by the authentication server 103. When approval to the effect that wireless power transmission may be performed to the wireless power receiver 102 is obtained, the controller 113 supplies a signal to instruct the wireless power transmitter 112 to supply the power transmission signal to the antenna 111.

The communication unit 114 is a so-called communication interface, and is a module for enabling communication with the authentication server 103.

Next, with reference to the sequence chart of FIG. 3, an example of the procedure of various processes including authentication processing performed between the wireless power transmission apparatus 101 and the authentication server 103 will be described. The authentication processing is performed, for example, when the wireless power transmission apparatus 101 receives a power transmission request from the wireless power receiver 102 to the effect that the wireless power receiver 102 wants the wireless power transmission apparatus 101 to transmit power.

First, in order to obtain approval for wireless power transmission to the wireless power receiver 102 within the range managed by the authentication server 103, the wireless power transmission apparatus 101 transmits a start request including information on the wireless power transmission apparatus 101 to the authentication server 103 (block B1).

Here, with reference to FIG. 4, information on the wireless power transmission apparatus 101 included in the start request will be described. As shown in FIG. 4, the start request includes an apparatus ID for identifying the wireless power transmission apparatus 101 as required information and state information indicating the current state of the wireless power transmission apparatus 101 as optional information.

The apparatus ID is unique information allocated to the wireless power transmission apparatus 101 by the authentication server 103, for example, at the time of registration of approval apparatus information to be described later.

As shown in FIG. 4, the state information includes items such as position information, azimuth information, angle information, time information, output information, antenna setting information, frequency information, radio wave type information, message ID, and the like. The position information is information indicating the position of the wireless power transmission apparatus 101. The azimuth information is information indicating a horizontal azimuth angle of the antenna 111 provided in the wireless power transmission apparatus 101. The angle information is information indicating the vertical elevation angle of the antenna 111 provided in the wireless power transmission apparatus 101. The time information is information indicating a time measured by a clock unit (not shown) in the wireless power transmission apparatus 101. The output information is information indicating transmission power (power of electromagnetic waves) of the wireless power transmission apparatus 101. It should be noted that the transmission power here refers to the antenna power not including the antenna gain of the antenna 111 provided in the wireless power transmission apparatus 101. The antenna setting information is information indicating the directivity pattern of the antenna 111 provided in the wireless power transmission apparatus 101 (that is, information indicating in which direction the antenna 111 has a sharp directivity). The frequency information is information indicating a frequency (power transmission frequency) used by the wireless power transmission apparatus 101 for performing wireless power transmission. The frequency information may further include an interference prediction level indicating how much interference can occur in other wireless communication systems when wireless power transmission is performed using the power transmission frequency. An example of the interference prediction level includes existence information of another wireless communication system measured by a measurement unit (not shown) in the wireless power transmission apparatus 101. The radio wave type information is information indicating the type (for example, microwave) of electromagnetic waves (radio waves) radiated from the wireless power transmission apparatus 101. The message ID is information for the wireless power transmission apparatus 101 to identify various responses to be described later.

As described above, it is sufficient that at least the apparatus ID is included in the start request. Here, it is assumed that the start request includes the above-described apparatus ID and the state information of items transmitted to the authentication server 103 at the time of registration of approval apparatus information to be described later.

Description returns to FIG. 3 again.

The authentication server 103 compares the information on the wireless power transmission apparatus 101 included in the received start request with at least one piece of approval apparatus information indicating a wireless power transmission apparatus that is approved to perform wireless power transmission within the range managed by the authentication server 103, and determines whether to approve the wireless power transmission by determining whether the approval apparatus information matching the information on the wireless power transmission apparatus 101 is registered (block B2).

The approval apparatus information is, for example, information registered in advance with a legally binding force. In order to register the approval apparatus information, before transmitting the start request, the wireless power transmission apparatus 101 transmits, to the authentication server 103, information of items necessary for preliminary registration among the above various pieces of state information. The authentication server 103 refers to the received information, issues an apparatus ID to the wireless power transmission apparatus 101 when it is determined that there is no problem when the wireless power transmission apparatus 101 performs wireless power transmission within the range managed by the authentication server 103, and registers the approval apparatus information associating the issued apparatus ID with the received information. The issued apparatus ID is transmitted to the wireless power transmission apparatus 101 together with the registration completion notification of the approval apparatus information. The apparatus ID is given at manufacturing time, and, upon pre-registration, is transmitted, together with information on items necessary for pre-registration, to the authentication server 103. When it is determined that there is no problem when the wireless power transmission apparatus 101 performs wireless power transmission within the range managed by the authentication server 103, the apparatus ID may be registered as approval apparatus information.

In the process of block B2, when the approval apparatus information matching the information on the wireless power transmission apparatus 101 is not registered, and it is determined that performing wireless power transmission is disapproved (NO in block B2), the authentication server 103 ends this process.

On the other hand, the wireless power transmission apparatus 101 determines that approval for performing wireless power transmission has not been obtained when the response from the authentication server 103 cannot be obtained (received) before the predetermined time T2 elapses after transmitting the start request, and ends this process after notifying the administrator of the wireless power transmission apparatus 101 of this fact. Note that the time T2 is a so-called maximum turnaround time and is set to any value.

The wireless power transmission apparatus 101 notifies the administrator of the wireless power transmission apparatus 101 that the start response has not been obtained (received), so that it is possible to notify the relevant administrator of the following. That is, it is necessary to check the current state of the wireless power transmission apparatus 101, there is a possibility that communication with the authentication server 103 may not be established, there is a possibility that a malfunction may have occurred in the authentication server 103, and the like.

In the process of block B2, a case where it is determined that the approval apparatus information matching the information on the wireless power transmission apparatus 101 is not registered includes a case where the approval apparatus information including the apparatus ID matching the apparatus ID included in the start request is not registered in the first place. In addition, another case includes a case where although the approval apparatus information including the apparatus ID matching the apparatus ID included in the start request is registered, the state information included in the start request differs from the state information included in the approval apparatus information. According to this, it is possible to suppress the case where unregistered wireless power transmission apparatuses or wireless power transmission apparatuses whose states are different from those at the time of registration of approval apparatus information perform wireless power transmission, and interfere with other wireless communication systems (for example, the wireless LAN system, the DSRC system, and the like).

In addition, according to this, it is determined automatically that it was not able to obtain approval for wireless power transmission when the wireless power transmission apparatus 101 fails to obtain (receive) a response from the authentication server 103 before the elapse of time T2 after transmitting the start request. The present embodiment is not limited thereto. It may be determined that the wireless power transmission apparatus 101 was not able to obtain approval for wireless power transmission when obtaining (receiving) the disapproval response transmitted from the authentication server 103.

In the process of block B2, when approval apparatus information matching the information on the wireless power transmission apparatus 101 is registered, and it is determined that the wireless power transmission is approved (YES in block B2), the authentication server 103 returns, to the wireless power transmission apparatus 101, a start response to the effect that the authentication server 103 approves the wireless power transmission within the range managed by the authentication server 103 (block B3). When the wireless power transmission apparatus 101 is able to obtain (receive) a start response from the authentication server 103 before the time T2 elapses after the transmission of the start request, the wireless power transmission apparatus 101 starts wireless power transmission to the wireless power receiver 102 (block B4).

Here, with reference to FIG. 5, information included in the start response will be described. As shown in FIG. 5, the start response includes message identification information for identifying a start response as required information and response information as optional information.

The message identification information is information for enabling the wireless power transmission apparatus 101 to identify the start response, and includes, for example, the above-described apparatus ID, message ID, and the like. The response information includes, for example, approval time information indicating the time at which the authentication server 103 approved the request from the wireless power transmission apparatus 101, approval period information indicating the start time and end time of the later-described times T1, T3, T5, and the like.

Description returns to FIG. 3 again.

Next, the wireless power transmission apparatus 101 transmits, to the authentication server 103, the continuation request including information necessary for continuing the wireless power transmission before the predetermined time T1 elapses after the transmission of the start request in the process of block B1 (block B5).

It should be noted that the information necessary for continuing the wireless power transmission may be the same as the information on the wireless power transmission apparatus 101 included in the start request, or may be part of the information on the wireless power transmission apparatus 101. Further, in the present embodiment, the time T1 is prescribed as the maximum waiting time (period) from the transmission of the start request to the transmission of the continuation request. The present embodiment is not limited thereto. The time T1 may be defined as the maximum waiting time (period) from the time when the start response is returned to the time when the continuation request is transmitted in the process of block B3.

The authentication server 103 compares the information necessary for continuously performing the wireless power transmission included in the received continuation request with one or more pieces of approval apparatus information as described above, and determines whether the approval apparatus information matching the information necessary for continuing the wireless power transmission is registered, so that it is determined whether to approve the continuous performance of the wireless power transmission (block B6).

In the process of block B6, when the approval apparatus information matching the information necessary for continuing the wireless power transmission is not registered, and it is determined that the continuous performance of the wireless power transmission is disapproved (NO in block B6), the authentication server 103 ends this process.

On the other hand, the wireless power transmission apparatus 101 determines that approval for continuing wireless power transmission has not been obtained when the response from the authentication server 103 cannot be obtained (received) before the predetermined time T4 elapses after transmitting the continuation request, stops wireless power transmission to the wireless power receiver 102, and ends this process after notifying the administrator of the wireless power transmission apparatus 101 of this fact. It should be noted that the time T4 is a so-called maximum turnaround time like the time T2, and may be the same as or different from the time T2.

In the process of block B6, a case in which the continuous performance of wireless power transmission is disapproved includes a case where although the approval apparatus information including the apparatus ID matching the apparatus ID included in the continuation request is registered, the state information included in the continuation request is different from the state information included in the approval apparatus information. Specifically, an example of the case includes a case where after starting the wireless power transmission, the position of the wireless power transmission apparatus 101, the azimuth angle, the elevation angle, etc., of the antenna 111 have changed from those at the start of wireless power transmission due to some reason.

In the process of block B6, when approval apparatus information matching the information necessary for continuing wireless power transmission is registered, and it is determined that the continuous performance of the wireless power transmission is approved (YES in block B6), the authentication server 103 returns, to the wireless power transmission apparatus 101, a continuation response to the effect that the authentication server 103 approves the continuous performance of the wireless power transmission within the range managed by the authentication server 103 (block B7). When the wireless power transmission apparatus 101 is able to obtain (receive) a continuation response from the authentication server 103 before the time T4 elapses after the transmission of the continuation request, the wireless power transmission apparatus 101 continues wireless power transmission to the wireless power receiver 102 (block B8).

Next, the wireless power transmission apparatus 101 transmits, again to the authentication server 103, the continuation request including information necessary for continuing the wireless power transmission before the predetermined time T3 elapses after the transmission of the continuation request in the process of block B5 (block B9).

Further, in the present embodiment, the time T3 is prescribed as the maximum waiting time (period) from the transmission of the continuation request to the transmission of the second time continuation request. The present embodiment is not limited thereto. The time T3 may be defined as the maximum waiting time (period) from the time when the continuation response is returned in the process of block B7 to the time when the second time continuation request is transmitted. Further, the time T3 may be set so as to increase as the wireless power transmission continues. That is, dynamic setting may be made such that the time T3 set for the second time continuation is larger than the time T1 set for the first time continuation.

After the process of block B9, the processing same as the above-described blocks B6 to B8 is performed in order (blocks B10 to B12). Thereafter, the process of the blocks B9 to B12 is repeatedly performed. The wireless power transmission apparatus 101 stops the wireless power transmission to the wireless power receiver 102 when a predetermined time T5 has elapsed after transmitting the start request in the process of block B1 (block B13), and ends this process.

In the present embodiment, the time T5 is prescribed as the maximum value of the time during which the wireless power transmission can be continuously performed after transmitting the start request. The present embodiment is not limited thereto. The time T5 may be defined as the maximum value of the time during which the wireless power transmission can be continuously performed after the start response is returned in the process of block B3. Alternatively, the time T5 may not be set. In this case, the wireless power transmission apparatus 101 performs wireless power transmission while repeatedly performing the above-described process of blocks B9 to B12 until sufficient power transmission to the wireless power receiver 102 is completed.

In addition, the wireless power transmission apparatus 101 may again perform a series of processes from block B1 by transmitting a start request again before the predetermined time T5 elapses. In this case, the count of the time T5 is reset at the time when a new start request is transmitted, and the count of the time T5 is started again.

As explained above, in order to determine whether the wireless power transmission apparatus 101 is in an environment where wireless power transmission to the wireless power receiver 102 may be performed, the wireless power transmission apparatus 101 transmits a start request or a continuation request including at least the apparatus ID to the authentication server 103, and has a configuration in which the wireless power transmission to the wireless power receiver 102 is performed only when the start response or the continuation response from the authentication server 103 can be obtained (received), so that it is possible to suppress wireless power transmission in an environment in which the wireless power transmission apparatus 101 can interfere with other wireless communication systems.

Figure 3:
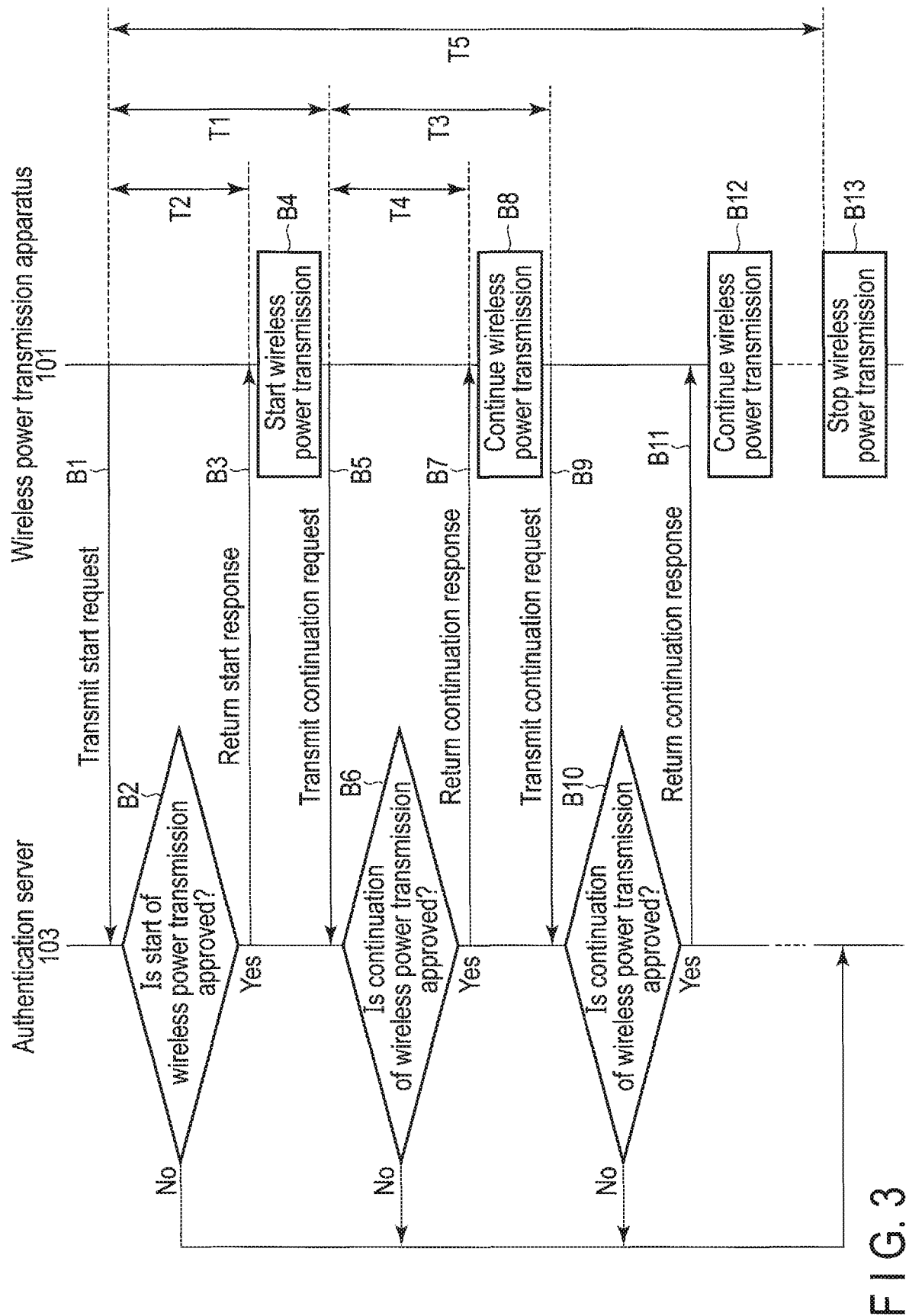
FIG. 3 is a sequence chart showing an example of a series of processing procedures performed between the wireless power transmission apparatus and an authentication server according to the embodiment.

Note that the series of processing procedures performed between the wireless power transmission apparatus 101 and the authentication server 103 is not limited to the processing procedure shown in FIG. 3. For example, various processes may be performed between the wireless power transmission apparatus 101 and the authentication server 103 by the processing procedure as shown in FIG. 6. Hereinafter, the detailed description of the processing shown in FIG. 3 will be omitted, and only the processing different from that in FIG. 3 will be described in detail.

First, in order to obtain approval for wireless power transmission to the wireless power receiver 102 within the range managed by the authentication server 103, the wireless power transmission apparatus 101 transmits a start request to the authentication server 103 (block B21). At this time, the wireless power transmission apparatus 101 transmits, to the authentication server 103, the start request in a state where the information on the wireless power transmission apparatus 101 is not included in the start request.

Upon receiving the start request transmitted by the wireless power transmission apparatus 101, the authentication server 103 returns, to the wireless power transmission apparatus 101, a first start response for giving an instruction of items of information necessary for approving wireless power transmission (block B22). Note that when the wireless power transmission apparatus 101 fails to obtain (receive) the first start response from the authentication server 103 before the lapse of the predetermined time T2 after transmitting the start request, the wireless power transmission apparatus 101 may perform the process of block B21 again. Alternatively, the wireless power transmission apparatus 101 notifies the administrator of the wireless power transmission apparatus 101 that the first start response has not been obtained (received), so that it is possible to notify the relevant administrator of the following. There is a possibility that communication with the authentication server 103 may not be established, and there is a possibility that a malfunction may have occurred in the authentication server 103.

When the wireless power transmission apparatus 101 receives the first start response returned from the authentication server 103, the wireless power transmission apparatus 101 transmits, to the authentication server 103, the information of the item given in instruction by the information included in the first start response among the information on the wireless power transmission apparatus 101 (block B23).

Upon receiving the information on the wireless power transmission apparatus 101 transmitted by the wireless power transmission apparatus 101, the authentication server 103 performs the process same as the above-described process of block B2 to determine whether to approve the wireless power transmission (block B24).

In the process of block B24, when it is determined that the wireless power transmission is approved (YES in block B24), the authentication server 103, as with the above-described process of block B3, returns, to the wireless power transmission apparatus 101, a second start response to the effect that the wireless power transmission is approved within the range managed by the authentication server 103 (block B25). When the wireless power transmission apparatus 101 can obtain (receive) the second start response from the authentication server 103 before the lapse of the predetermined time T2 after transmitting the information on the wireless power transmission apparatus 101 in the process of block B23, the wireless power transmission apparatus 101 starts wireless power transmission to the wireless power receiver 102 (block B26).

Thereafter, processing similar to the process of the above-described blocks B5 to B8 (or B9 to B12) is performed (blocks B27 to B30). Thereafter, as in the above-described process of block B13, the wireless power transmission apparatus 101 stops the wireless power transmission to the wireless power receiver 102 when a predetermined time T5 has elapsed after transmitting the start request in the process of block B21 (block B31), and ends this process.

In this case, the item of information necessary for approval is given in instruction only in the case of the start request. However, the embodiment is not limited to this. The item of information necessary for approval is given in instruction in the case of the continuation request. In this case, in response to the continuation request, the authentication server 103 returns a first continuation response for giving an instruction of an item of information necessary for approval, and further returns a second continuation response in the case where the authentication server 103 approves the continuous performance of the wireless power transmission.

The series of processing procedures performed between the wireless power transmission apparatus 101 and the authentication server 103 is not limited to the processing procedures shown in FIGS. 3 and 6. For example, various processes may be performed between the wireless power transmission apparatus 101 and the authentication server 103 by a processing procedure as shown in FIG. 7. In the following, the detailed description of the processing already described is omitted, and only the processing which has not been described yet will be explained in detail.

First, the process similar to the above-described process of blocks B1 and B2 is performed (blocks B41 and B42), and in the process of block B42, when it is determined that the wireless power transmission is approved (YES in block B42), the authentication server 103 returns a start response to the effect that the wireless power transmission within the range managed by the authentication server 103 is approved, and including information for giving an instruction of an item of information necessary for approval for subsequent continuation requests (block B43). When the wireless power transmission apparatus 101 is able to obtain (receive) a start response from the authentication server 103 before the time T2 elapses after the transmission of the start request, the wireless power transmission apparatus 101 starts wireless power transmission to the wireless power receiver 102 (block B44).

Next, the wireless power transmission apparatus 101 transmits, to the authentication server 103, the continuation request including information given in instruction by the start response before the predetermined time T1 elapses after the transmission of the start request in the process of block B41 (block B45).

Thereafter, processing similar to the above-described process of blocks B6 to B8 is performed (blocks B46 to B48). Thereafter, as in the above-described process of block B13, the wireless power transmission apparatus 101 stops the wireless power transmission to the wireless power receiver 102 when a predetermined time T5 has elapsed after transmitting the start request in the process of block B41 (block B49), and ends this process.

Figure 8:
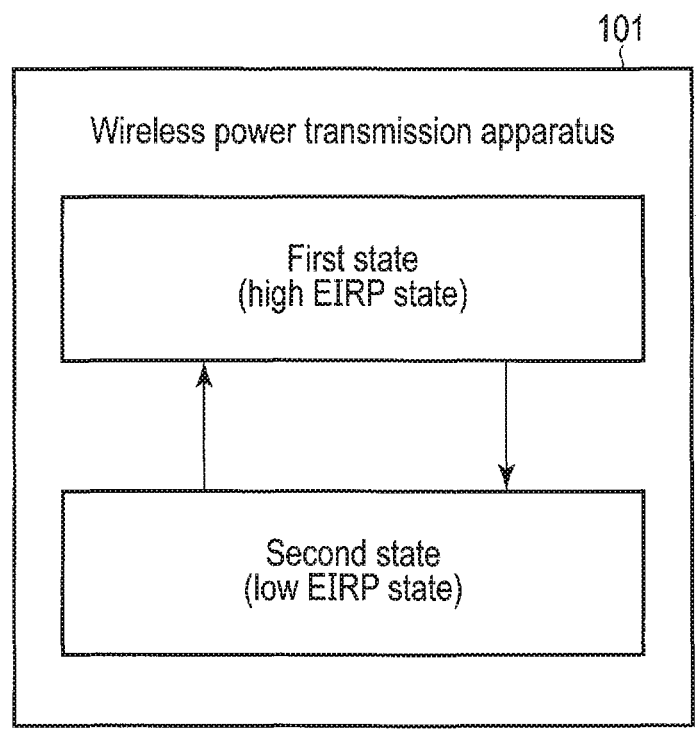
FIG. 8 is a diagram for explaining a function of the wireless power transmission apparatus according to the embodiment.

In addition, as shown in FIG. 8, the controller 113 according to the present embodiment may further have a function capable of switching between a first state and a second state based on the maximum equivalent isotropically radiated power (EIRP). The first state may be referred to as a high EIRP state or a state in which the maximum value of the transmission power is higher than that of the second state or a state in which there is a sharp directivity in the power transmission direction, so that the maximum value of the antenna gain with respect to the power transmission direction is high (that is, the state where the EIRP is high). The controller 113 performs switching between the first state and the second state by changing the range of the value (the value of the transmission power itself or the value for defining the transmission power) set in the wireless power transmitter 112.

In the case of having such a function, in the first state, the wireless power transmission apparatus 101 performs wireless power transmission after obtaining, from the authentication server 103, approval to the effect that wireless power transmission may be performed, and in the second state, the wireless power transmission apparatus 101 may perform wireless power transmission without obtaining approval from the authentication server 103. This is due to the fact that it is expected that the value of the transmission power will be low in the second state and the possibility of interference with other wireless communication systems is low.

On the other hand, in the first state, the value of the transmission power is expected to be high, and the possibility of interfering with other wireless communication systems is high, compared with the possibility in the second state, so that the wireless power transmission apparatus 101 performs one of the series of processes shown in FIGS. 3, 6, and 7. When the start response is obtained (received), wireless power transmission is started, and when the continuation response is obtained (received), wireless power transmission is continued.

When the start response is not obtained (received), rather than not performing wireless power transmission to the wireless power receiver 102, the wireless power transmission apparatus 101 may switch the state of the wireless power transmission apparatus 101 from the first state to the second state, and may perform wireless power transmission to the wireless power receiver 102 with low transmission power without obtaining approval from the authentication server 103. Similarly, when a continuation response is not obtained (received), rather than stopping the wireless power transmission to the wireless power receiver 102 the wireless power transmission apparatus 101 may switch the state of the wireless power transmission apparatus 101 from the first state to the second state, and may continue the wireless power transmission to the wireless power receiver 102 with low transmission power without obtaining approval from the authentication server 103. However, even in such a case, when an abnormality is detected by the self-diagnosis function provided in the wireless power transmission apparatus 101, the wireless power transmission apparatus 101 stops the wireless power transmission regardless of the current state.

In this way, the controller 113 further has a function capable of switching between the first state and the second state (in other words, function capable of switching between wireless power transmission in the first state, and the wireless power transmission in the second state which is performed with transmission power lower than that in the first state), so that it is possible to perform wireless power transmission after switching to the second state, for example, even when communication with the authentication server 103 cannot be established, or even when a malfunction has occurred in the authentication server 103 or the like, thereby improving power transmission efficiency.

In this case, although the first state and the second state can be switched based on the maximum equivalent isotropically radiated power, the present embodiment is not limited to this. The first state and the second state may be switchable based on the current transmission power.

Figure 9:
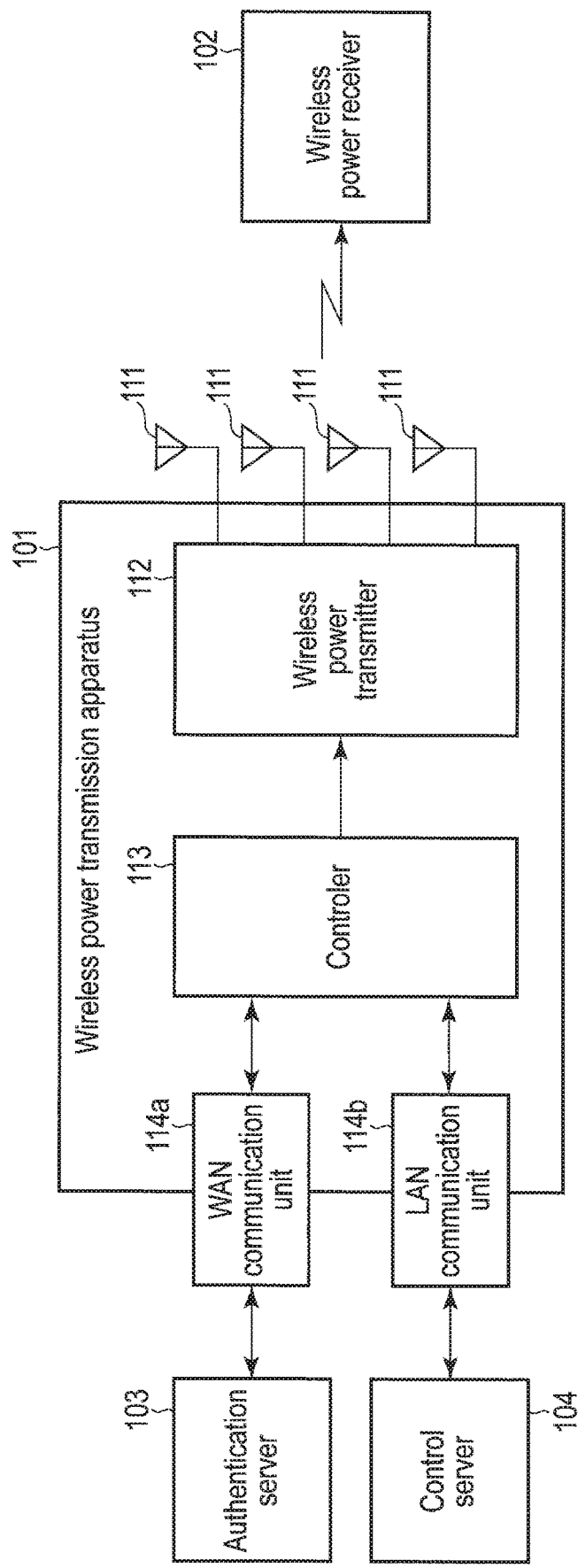
FIG. 9 shows a hardware configuration of a wireless power transmission apparatus different from that of FIG. 2.

Further, as shown in FIG. 9, the wireless power transmission apparatus 101 according to the present embodiment may include a wide area network (WAN) communication unit 114a and a local area network (LAN) communication unit 114b instead of the communication unit 114. The WAN communication unit 114a enables communication with the authentication server 103 and the LAN communication unit 114b enables communication with a control server 104 different from the authentication server 103. The control server 104 manages information on setting (power transmission setting) when the wireless power transmission apparatus 101 transmits power to the wireless power receiver 102.

In this case, the controller 113 of the wireless power transmission apparatus 101 acquires, from the control server 104 via the LAN communication unit 114b, information on setting (power transmission setting) at the time of performing wireless power transmission. The controller 113 adjusts the power transmission setting of the wireless power transmission apparatus 101 with reference to the acquired information on the power transmission setting, and then transmits a start request to the authentication server 103 via the WAN communication unit 114a.

In this way, since the controller 113 has a function capable of acquiring the power transmission setting from the control server 104, the administrator of the wireless power transmission apparatus 101 can adjust the power transmission setting without directly operating the wireless power transmission apparatus 101, whereby it is possible to easily perform remote control of the wireless power transmission apparatus 101.

Note that the communication line connected to the authentication server 103 passes through a wide area wireless line such as an LTE from the viewpoint of reliability whereas the communication line connected to the control server 104 passes through a wired LAN or a wireless LAN. The wireless power transfer environment is constructed in which the wireless power transmission apparatus is connected to the server apparatus via different lines as described above, so that the authentication server 103 and the control server 104 can be installed in different places, and it is also possible to perform control and set the security level for respective servers. In addition, since it is possible to distribute the load on the line between the server apparatus and the wireless power transmission apparatus at the time of wireless power transmission, for example, even when a malfunction occurs in the line between the control server 104 and the wireless power transmission apparatus, there is no influence on the line between the authentication server 103 and the wireless power transmission apparatus, and it is possible to prevent a situation in which a start response or a continuation response cannot be obtained (received).

According to the embodiment described above, wireless power transmission can be performed without giving serious interference to other wireless communication systems.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
a power transmitter configured to transmit power by using electromagnetic waves; and
control circuitry configured to transmit a first request to a first server before power transmission, and to start power transmission by the power transmitter when a first response from the first server relating to the first request is received,
wherein the power transmitter is configured to switch between power transmission with a first transmission power and power transmission with a second transmission power higher than the first transmission power,
wherein the control circuitry is configured to:
transmit a second request for continuing power transmission to the first server after a first period has elapsed since power transmission was started, continue power transmission by the power transmitter when a second response from the first server relating to the second request is received, stop power transmission by the power transmitter if the second response is not received, transmit a third request to the first server before power transmission with the second transmission power is started, and start power transmission with the second transmission power by the power transmitter when a third response from the first server relating to the third request is received, start power transmission with the first transmission power by the power transmitter if the third response is not received, transmit, to the first server, a fourth request for continuing power transmission with the second transmission power after a second period has elapsed since power transmission was started with the second transmission power, continue power transmission with the second transmission power when a fourth response from the first server relating to the fourth request is received, and start power transmission with the first transmission power by the power transmitter if the fourth response is not received, and wherein the first request, the second request, and the third request each include first information identifying the electronic apparatus.

2. The electronic apparatus of claim 1, wherein the first request and the third request each further include second information indicating a state of the electronic apparatus.

3. The electronic apparatus of claim 2, wherein the second information includes information indicating a position of the electronic apparatus.

4. The electronic apparatus of claim 2, wherein the second information includes information indicating a horizontal azimuth angle of an antenna provided in the electronic apparatus.

5. The electronic apparatus of claim 2, wherein the second information includes information indicating a vertical elevation angle of an antenna provided in the electronic apparatus.

6. The electronic apparatus of claim 2, wherein the second information includes information indicating to what extent the second information interferes with another wireless communication system.

7. The electronic apparatus of claim 1, wherein the control circuitry is configured to:

receive, from a second server different from the first server, third information relating to a power transmission setting at power transmission, and adjust the power transmission setting based on the third information before transmitting the first request to the first server.

8. A method applied to an electronic apparatus, the method comprising:

transmitting power by using electromagnetic waves, transmitting a first request to a first server before power transmission, and starting power transmission when a first response from the first server relating to the first request is received, transmitting a second request for continuing power transmission to the first server after a first period has elapsed since power transmission was started, continuing power transmission when a second response from the first server relating to the second request is received, stopping power transmission if the second response is not received, switching between power transmission with a first transmission power and power transmission with a second transmission power higher than the first transmission power, transmitting a third request to the first server before power transmission with the second transmission power is started, and starting power transmission with the second transmission power when a third response from the first server relating to the third request is received, starting power transmission with the first transmission power if the third response is not received, transmitting, to the first server, a fourth request for continuing power transmission with the second transmission power after a second period has elapsed since power transmission was started with the second transmission power, continuing power transmission with the second transmission power when a fourth response from the first server relating to the fourth request is received, and starting power transmission with the first transmission power if the fourth response is not received, wherein the first request, the second request, and the third request each include first information identifying the electronic apparatus.

9. The method of claim 8, wherein the first request and the third request each further include second information indicating a state of the electronic apparatus.

10. The method of claim 9, wherein the second information includes information indicating a position of the electronic apparatus.

11. The method of claim 9, wherein the second information includes information indicating a horizontal azimuth angle of an antenna provided in the electronic apparatus.

12. The method of claim 9, wherein the second information includes information indicating a vertical elevation angle of an antenna provided in the electronic apparatus.

13. The method of claim 9, wherein the second information includes information indicating to what extent the second information interferes with another wireless communication system.

14. The method of claim 8, further comprising:

receiving, from a second server different from the first server, third information relating to a power transmission setting at power transmission, and adjusting the power transmission setting based on the third information before transmitting the first request to the first server.

* * * * *